(12) United States Patent
Inoue et al.

(10) Patent No.: US 7,608,801 B2
(45) Date of Patent: Oct. 27, 2009

(54) METHOD OF ASSEMBLING MOTOR VEHICLE BODY

(75) Inventors: Shinobu Inoue, Ikeda (JP); Masaharu Saito, Ikeda (JP); Akiyoshi Hazama, Ikeda (JP); Yasuhiro Hosokawa, Ikeda (JP); Takuma Arai, Ikeda (JP); Isao Kita, Ikeda (JP); Takuji Izutani, Ikeda (JP); Kazuto Ikeda, Ikeda (JP)

(73) Assignee: Daihatsu Motor Co., Ltd., Osaka (JP)

( * ) Notice: Subject to any disclaimer, the term of this patent is extended or adjusted under 35 U.S.C. 154(b) by 522 days.

(21) Appl. No.: 10/532,462

(22) PCT Filed: Oct. 17, 2003

(86) PCT No.: PCT/JP03/13337

§ 371 (c)(1),
(2), (4) Date: Apr. 22, 2005

(87) PCT Pub. No.: WO2004/037635

PCT Pub. Date: May 6, 2004

(65) Prior Publication Data
US 2006/0037185 A1    Feb. 23, 2006

(30) Foreign Application Priority Data
Oct. 22, 2002    (JP)    ............... 2002-307059

(51) Int. Cl.
*B23K 37/053*    (2006.01)
*B23K 9/007*    (2006.01)

(52) U.S. Cl. ................... 219/158; 219/79; 219/80; 29/428; 29/429; 29/430; 228/212

(58) Field of Classification Search ............. 219/79, 219/80, 117.1, 121.82, 158; 29/428–431, 29/464–469, 771; 228/212
See application file for complete search history.

(56) References Cited

U.S. PATENT DOCUMENTS

| 5,943,768 | A  | * | 8/1999  | Ray .......................... 29/822 |
| 5,972,112 | A  | * | 10/1999 | Wood et al. ............... 118/423 |
| 6,170,732 | B1 | * | 1/2001  | Vogt et al. ................ 228/4.1 |
| 6,595,407 | B2 | * | 7/2003  | McNamara et al. ......... 228/212 |
| 2003/0037432 | A1 | * | 2/2003 | McNamara ................ 29/771 |
| 2005/0017057 | A1 | * | 1/2005 | Motomi et al. ............. 228/212 |

FOREIGN PATENT DOCUMENTS

| JP | 53-151007 | 11/1978 |
| JP | 62-110580 | 5/1987 |
| JP | 2-144267 | 6/1990 |
| JP | 2001-518858 | 10/2001 |
| JP | 2003-146263 | 5/2003 |
| WO | WO 98/45161 | 10/1998 |
| WO | WO 03/039941 A1 * | 5/2003 |

\* cited by examiner

*Primary Examiner*—Stephen J Ralis
(74) *Attorney, Agent, or Firm*—Hamre, Schumann, Mueller & Larson, P.C.

(57) ABSTRACT

A roof panel (31) is pre-set on the left and right side members (4) fixed to an underbody of a car. A roof panel spot welding station (7) includes a pair of frames (34) and two joisted-locating jigs (35, 36) bridging the frames. Each of the joisted-locating jigs is furnished with a clamp mechanism for holding the roof panel. The roof panel is located to the side members by the locating jigs, and spot-welded to the side members.

7 Claims, 16 Drawing Sheets

(A)

(B)

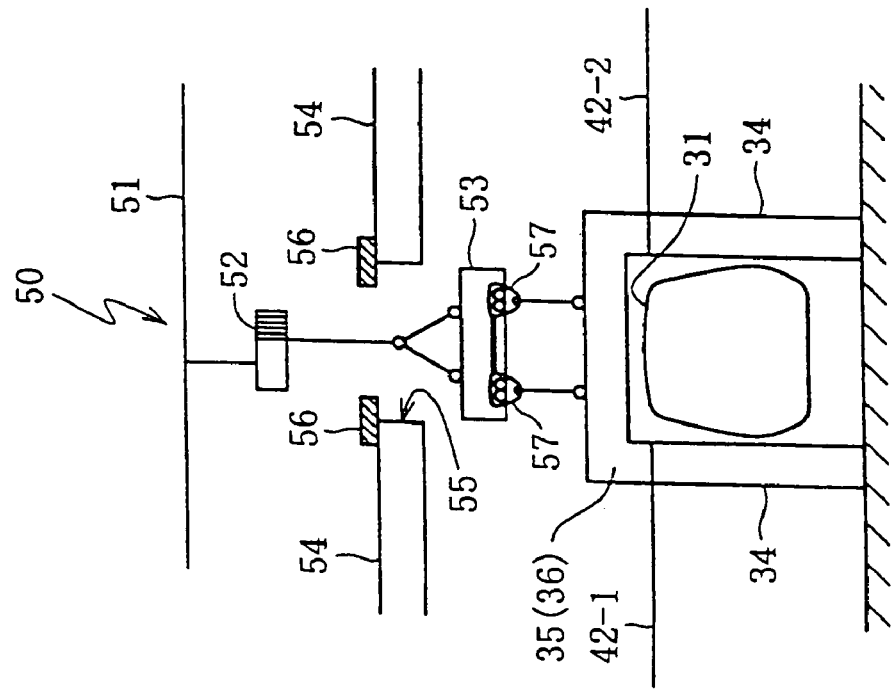
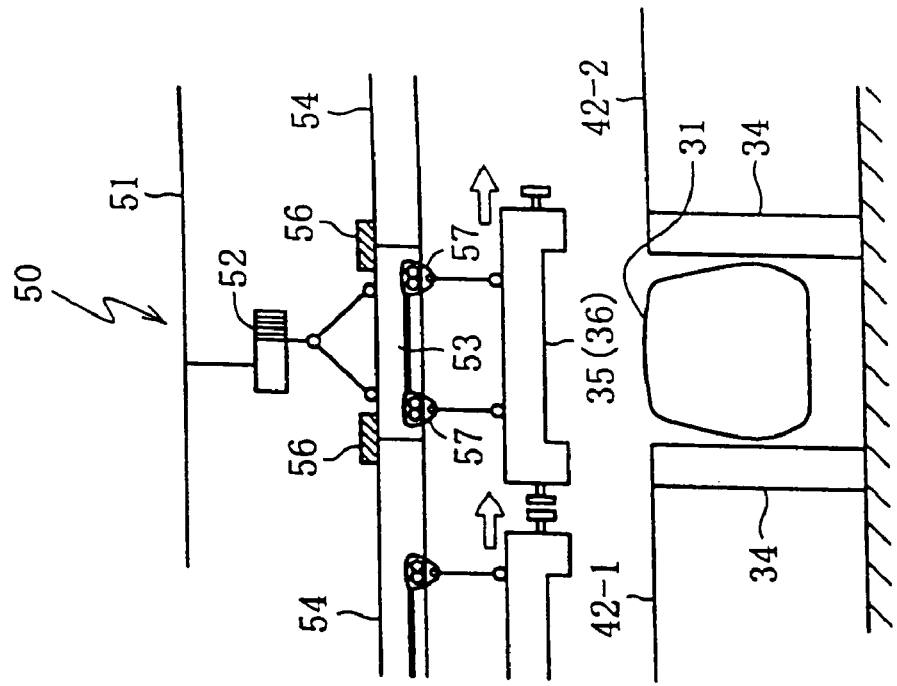

METHOD OF ASSEMBLING MOTOR VEHICLE BODY

TECHNICAL FIELD

The present invention relates to a method of assembling a motor vehicle body. Specifically, the present invention relates to a method for pre-fixing bridging parts, such as a roof panel, a header inner and a frame back, to the left and right side members, which are welded to an underbody of a car.

BACKGROUND ART

A car body includes main parts such as an underbody, left and right side members, and a roof panel. For assembling a car body using these parts, firstly the parts to be assembled are positioned relative to each other, using locating jigs, etc. Next, the parts are fixed by spot welding, thereafter re-spot welded to be fixed completely.

A conventional method of assembling a car body utilizes a significantly large locating jig for locating the main parts. For example, a jig used to position the roof panel is larger than the roof panel itself. Such locating jig is installed above the car body assembly line and is movable up and down. When pre-setting the roof panel on the left and right side members, the roof panel is transferred to a position below the locating jig, and set into the locating jig. Next, the locating jig is lowered to position both edges of the roof panel on the upper ends of the side members. Finally, in this manner, the roof panel is spot welded to the side member.

The above-described conventional locating jigs for roof panel are large and heavy, thus cause various problems. For example, conventional jigs tend to require large facility investment at the beginning. Further, it is very complicated to replace the locating jigs corresponding to types of cars to be manufactured. Specifically, the used locating jig should be removed from a hoist and another jig should be set in thereto. During this troublesome operation, the production line may be completely stopped.

Further, a motor for lifting the jig should bear a large load due to the large and heavy locating jig. Thus, a movable portion of the motor may suffer trouble such as wear, so that constant maintenance is needed for working the motor properly. Still further, it is difficult to perform precise location by using large and heavy locating jigs efficiently.

DISCLOSURE OF THE INVENTION

The present invention has been proposed under the above-described circumstances. It is therefore an object of the present invention to realize reduction in size and weight of the locating jig used for a bridging part such as a roof panel, a header board and a frame back.

The present invention provides a method of assembling a car body by spot welding a bridging part to a pair of side members fixed to an underbody of a car. The method comprising the steps of: placing a pair of frames at sides of a transfer line for transferring the underbody and the side members; attaching a plurality of detachable joisted-locating jigs to the frame for locating the side member and the bridging part; and spot welding the side members to the bridging part, with the side members and the bridging part being clamped by the joisted-locating jigs. An appropriate transfer system is employed to convey the joisted-locating jig from the frame to a first stock area and to convey another joisted-locating jig from a second stock area to the frame for performing a joisted-locating jig change.

The joisted-locating jig can be made lighter and smaller than conventional locating jig for roof panel. Thus, initial facility investment may be reduced. Further, the joisted-locating jig according to the present invention does not obstruct the assembly operation even if it is stored near the transfer line.

Preferably, the frame and the joisted-locating jig are positioned by a clamp mechanism.

Preferably, the transfer system includes a motor, a movable rail moved up and down by the motor, a fixed rail to be combined with the movable rail, and a pulley movable along the movable rail and the fixed rail. The joisted-locating jig is hung from the pulley.

Preferably, a sway prevention mechanism is provided for preventing the movable rail from swaying when the movable rail is apart from the fixed rail.

Preferably, the sway prevention mechanism includes a pair of vertical rods attached to the movable rail and a pair of fixed guides fixed to immovable structure. The vertical rod moves relative to the fixed guide be means of a roller.

Preferably, the movable rail is equipped with a fall-out prevention device, which is to prevent the pulley from falling out of the movable rail.

Preferably, the fall-out prevention device includes a stopper that turns on the pivot previously determined. The stopper is displaceable in the span between engaging and disengaging points of the stopper and the pulley.

BRIEF DESCRIPTION OF THE DRAWINGS

FIG. 18A is a schematic front view illustrating a transfer system for joisted-locating jigs used at the roof panel pre-setting station.

FIG. 18B is a view illustrating a movable rail of the transfer system in a lower position.

BEST MODE FOR CARRYING OUT THE INVENTION

As follows, a successful example of this invention is described in detail, with attached drawings being referred.

Figure 1:
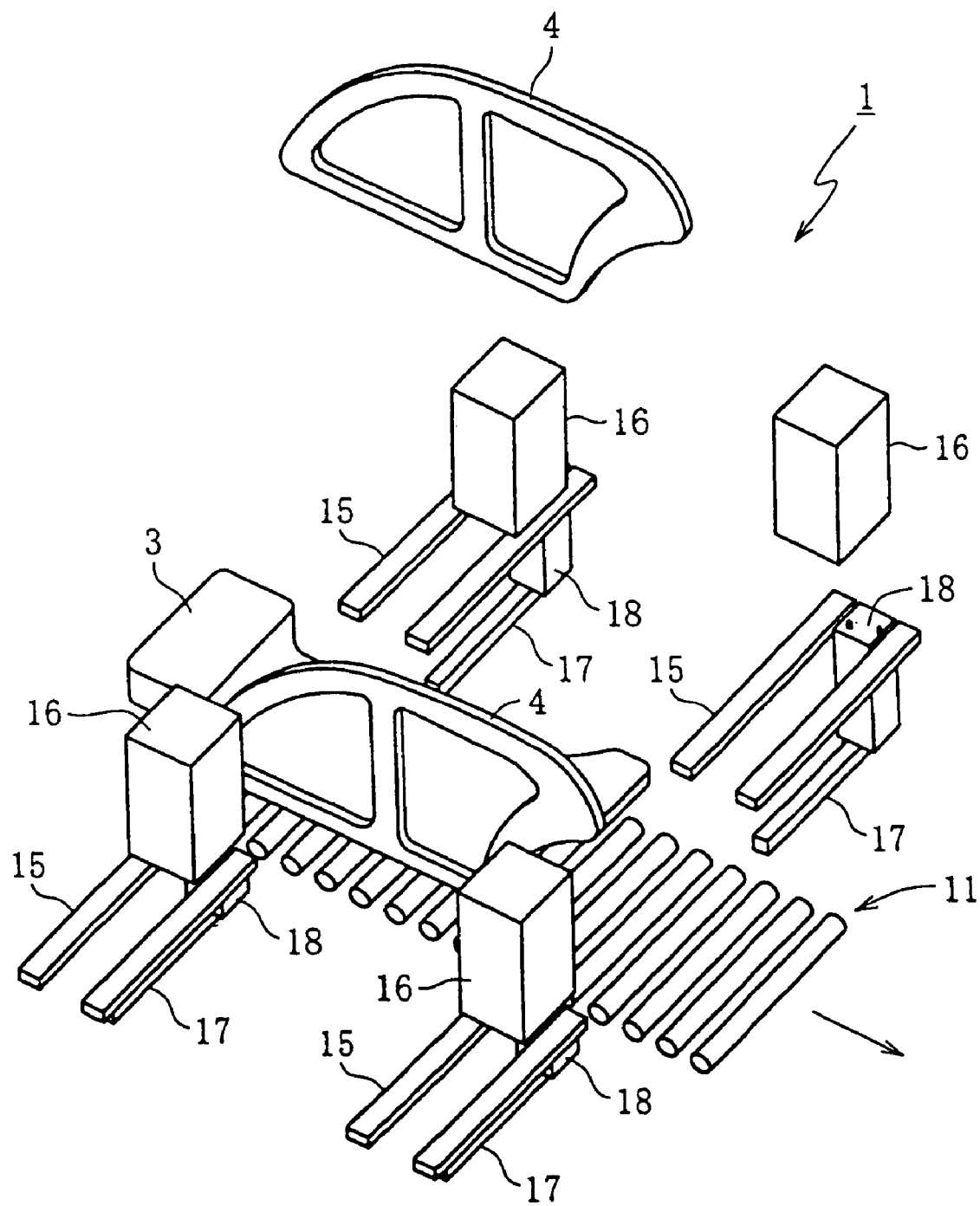
FIG. 1 is a schematic perspective view illustrating a spot welding station for spot welding a side member of a car to an underbody.

FIG. 1 is a schematic view illustrating a side member spot welding station 1. The side member spot welding station 1 is installed at a predetermined place in a car body assembly line 2 (see FIG. 2). The car body assembly line 2 includes an underbody loading station (not shown) installed upstream of the side member spot welding station 1 (the left side in FIG. 2). In this underbody loading station, an underbody 3 is set on coasters 13a, 13b (see FIG. 3). Thereafter, the underbody 3, including a rear portion facing downstream of the car body assembly line 2 for example, is carried by a roller conveyor 11 (see FIG. 4), to be sent to an underbody setting station 5 (#0) and to the side member spot welding station 1 (#1). The roller conveyor 11 includes a plurality of rotatable rollers 11a, each spaced to each other at a predetermined distance in the transfer direction of the underbody 3 and so on.

Figure 2:
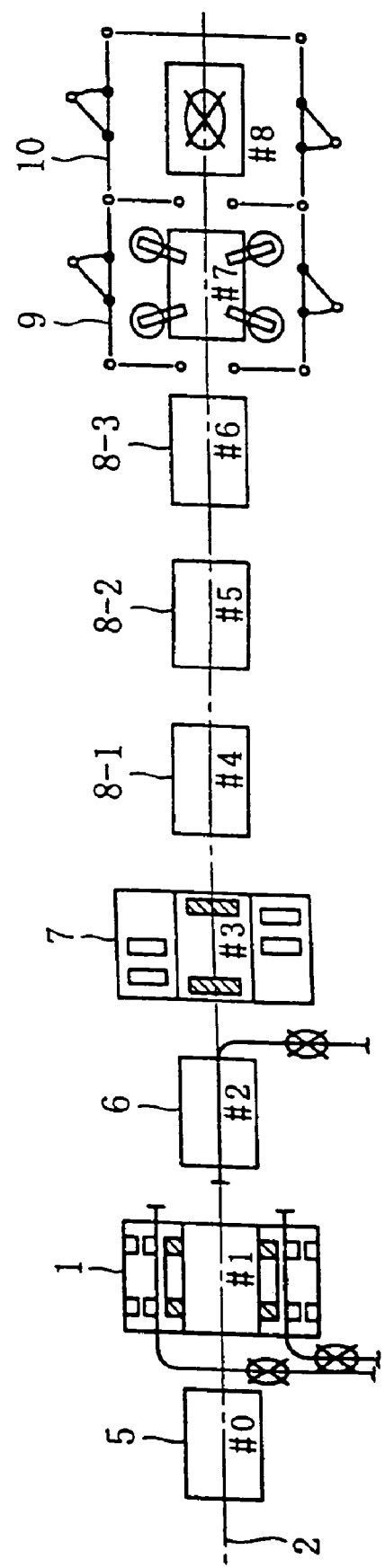
FIG. 2 is a schematic plan view illustrating a structure of a car body assembly line.

As shown in FIG. 2, the downstream side of the side member spot welding station 1 (#1) is provided with a roof panel pre-setting station 6 (#2) and a roof panel spot welding station 7 (#3). In the roof panel pre-setting station 6, a roof panel is pre-set on a side member 4, and the side member 4 is re-spot welded to the underbody 3. A roof panel re-spot welding station (#4) is install next to the roof panel spot welding station 7 (#3) on its downstream side. When many points of the roof panel is to be re-spot welded, as shown, a plurality of roof panel re-spot welding stations 8-1 (#4)-8-3 (#6) are installed so that workload for re-spot welding per one worker is not increased too much. The downstream side of the roof panel re-spot welding station is equipped with a re-spot welding station 9 (#7) having a welding robot, and also equipped with an unloading station 10 (#8).

In the side member spot welding station 1 and the roof panel pre-setting station 6, the height of the underbody 3 may need to be adjusted to corresponding types of cars. For this adjustment, each of the stations 1 and 6 is equipped with an elevating mechanism for lifting the conveyor 11. As shown in FIG. 4B, this elevating mechanism is a pantograph mechanism 14, for example. The pantograph mechanism 14 includes a plurality of supporting members 14a that are pivotable and joined by a pin 14, an air cylinder 14c, and a sliding mechanism 14d. The bottom end of one of the supporting members 14a is reciprocally moved in horizontal direction by the air cylinder 14c be means of the sliding mechanism 14d, thereby lifting and lowering the conveyor 11.

Figure 5:
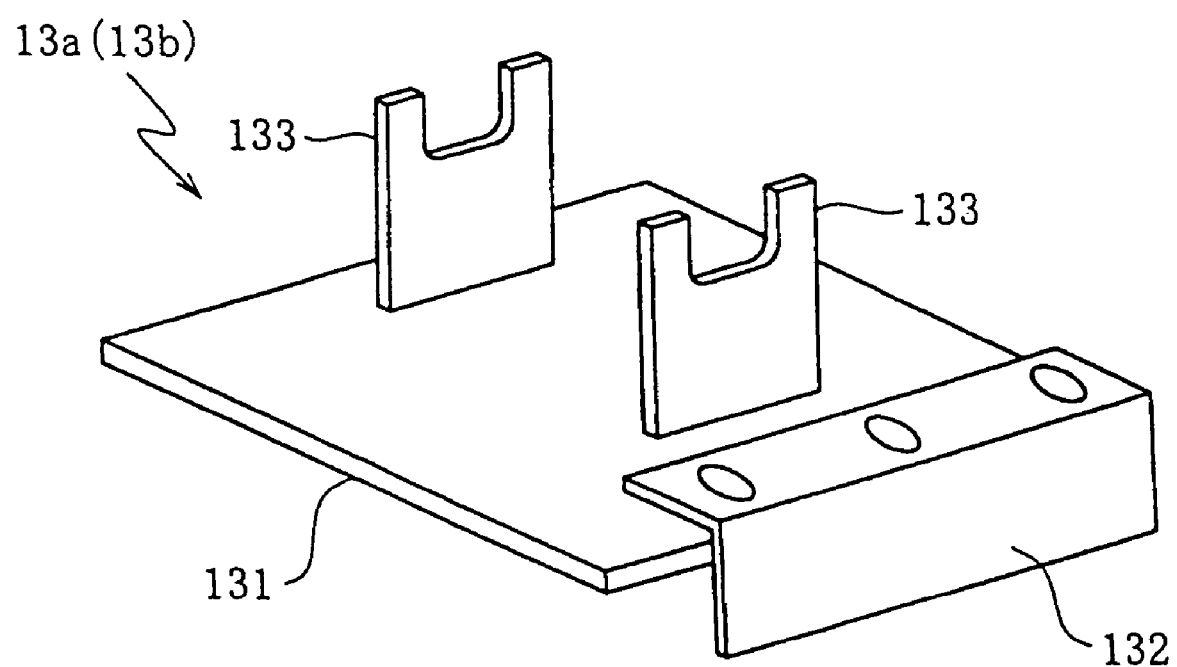
FIG. 5 is a schematic perspective view illustrating the coaster.

FIG. 5 illustrates the coasters 13a (13b) on which the underbody 3 is set. Each of the coasters 13a (13b) includes a rectangular base 131 for engaging with the rollers 11a of the conveyor 11. A pair of body-receiving parts 133 is installed on the upper surface of the base 131 vertically, which is to support the underbody 3. The body-receiving parts 133 are spaced to each other widthwise of the base 131 (perpendicularly to transfer direction). The width of the base 131 is shorter than the length of the roller 11a. One end of the base 131 is equipped with an angle bar 132 fixed by a bolt for preventing the coaster from moving widthwise during transfer. Another angle bar may be fixed at the other end of the base 131.

Figure 4A:
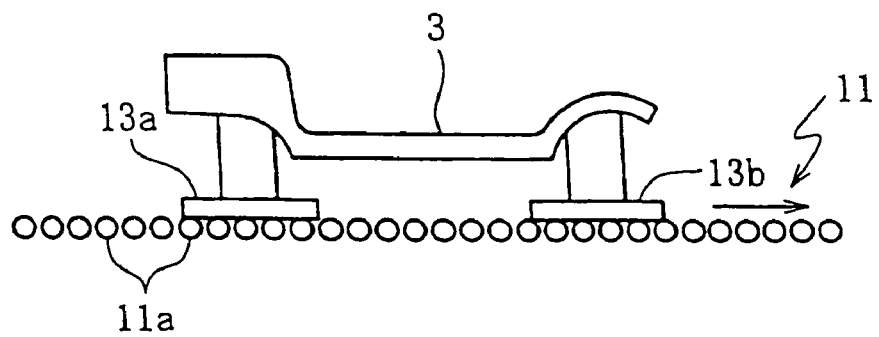
FIG. 4A is a schematic side view illustrating a roller conveyor for transferring the underbody shown in FIG. 3.
Figure 4B:
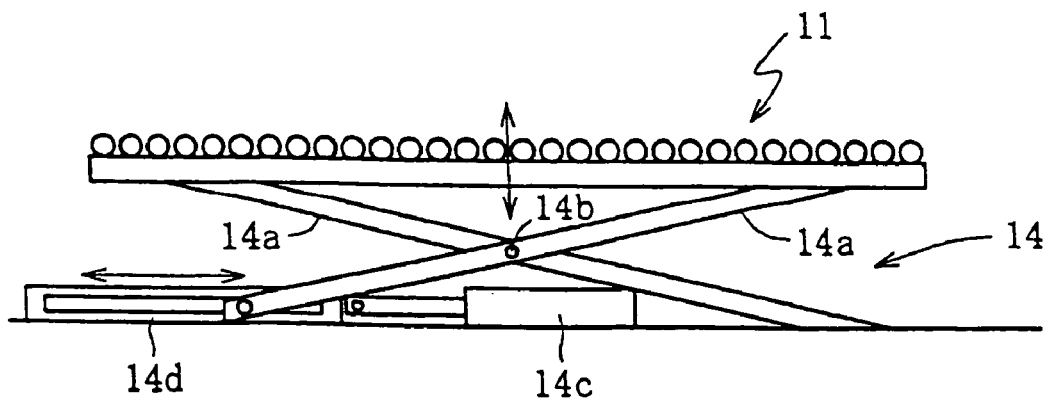
FIG. 4B is a schematic side view illustrating an elevating mechanism for adjusting the height of the roller conveyor.

As shown in FIG. 4A, the coasters 13a, 13b are arranged to support the front and the rear part of the underbody 3. As described above, each of the coasters includes two body-receiving parts 133 (see FIG. 5). Thus, the underbody 3 is supported by the coasters 13a, 13b at four points. A worker pushes the underbody 3 by hand and convey it on the roller conveyor 11.

Figure 7:
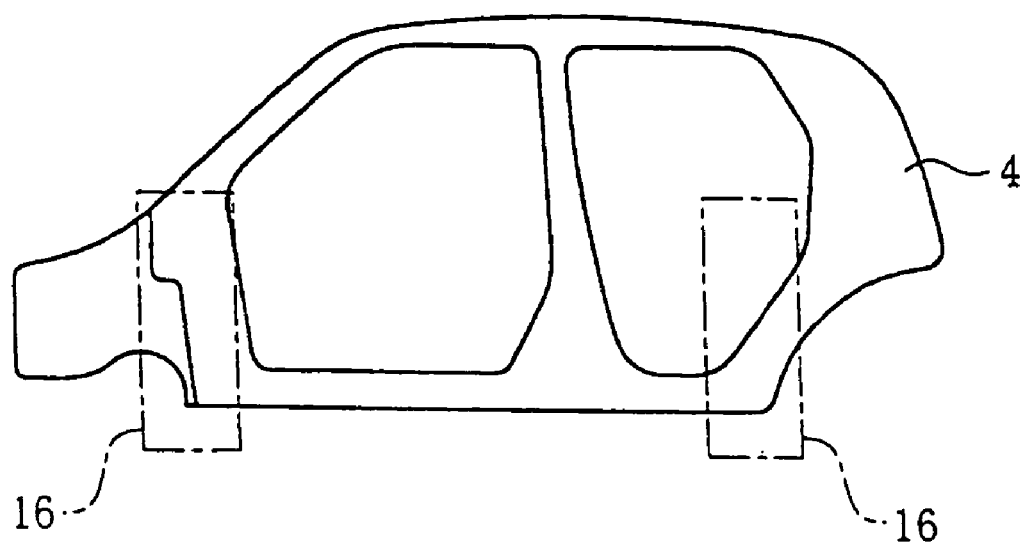
FIG. 7 is a side view illustrating the side member at the spot welding station.

As shown in FIG. 1, the side member spot welding station 1 is equipped with a plurality of locators 16 for locating left and right side members 4. In the illustrated example, two locators 16 are provided for each side member 4 (see also FIG. 7), and the locators are spaced to each other in the transfer direction of the assembly line. Each locator 16 includes an engaging unit (not shown) for engaging with a predetermined part of the side member 4. The engaging unit can be, for example, a clamp mechanism or a suction mechanism. The bottom area of the side member 4 is located by the locators 16 when it's spot welded to the underbody 3. As shown in FIG. 7, the locators 16 are smaller than the side member 4 as seen in the vertical direction (vertical direction in FIG. 7) and in the direction parallel to the transfer direction of the assembly line (lateral direction in FIG. 7).

Each locator 16 is equipped with a lifter 15 including two supporting plates spaced to each other in the transfer direction of the assembly line. The lifter 15 is movable in the vertical direction. Below each lifter 15, a slide guide 17 (see FIG. 1) is installed, projecting in parallel to the supporting plate. A slide base 18 is installed on the slide guide 17. The slide base 18 can move reciprocally along the slide guide 17, by worker's manual operation.

The lifter 15 can be lowered (and lifted), while supporting the locator 16. The locator 16 set on the lifter 15 is moved downward and transferred to the lower slide base 18. Thereafter, the slide base 18 is moved along the slide guide 17 to displace the locator 16 toward the assembly line 2 (forward) or away from the assembly line 2 (backward).

Figure 6A:
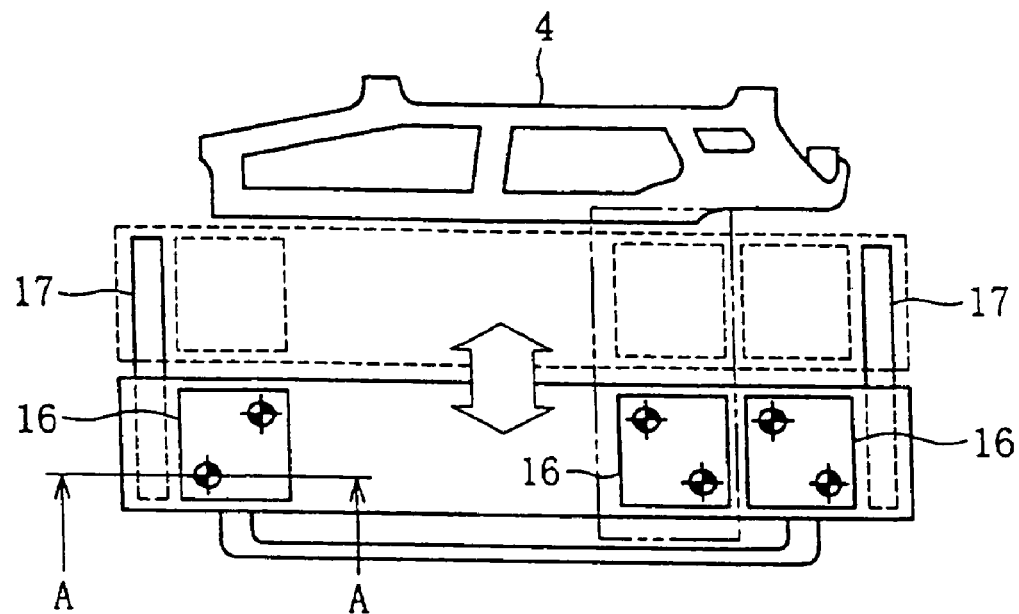
FIG. 6A illustrates an example where three locators are used for one side member.
Figure 6B:
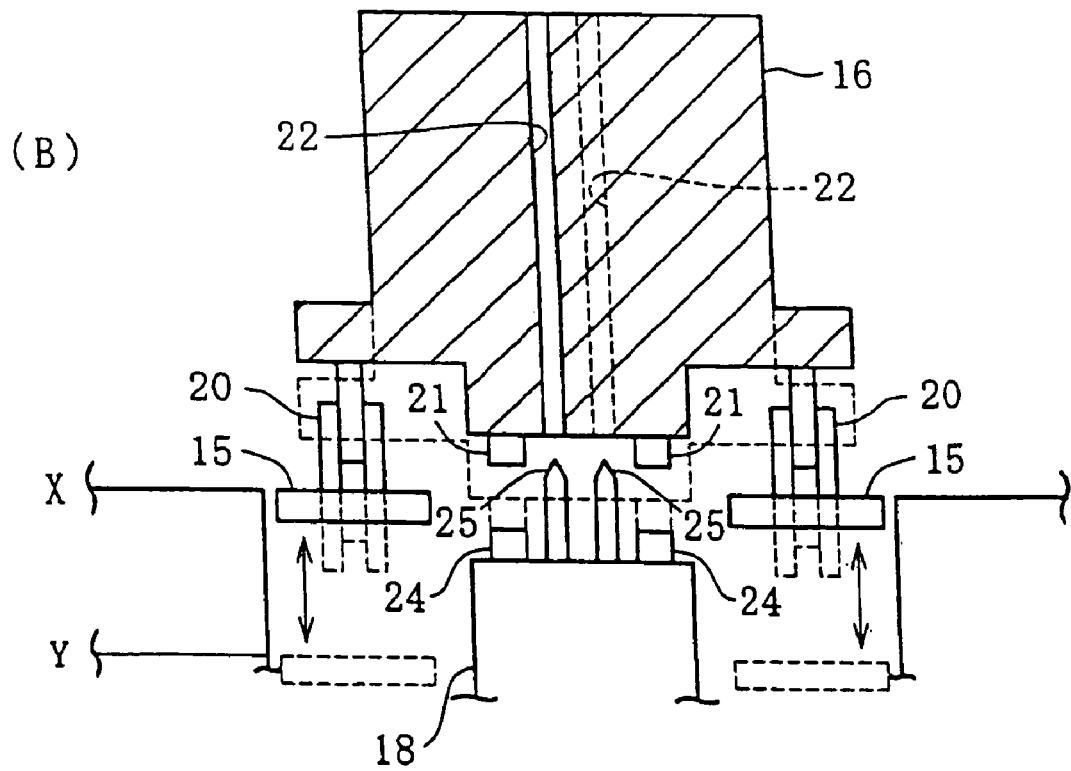
FIG. 6B is a section view taken along a line A-A in FIG. 6A.
Figure 8:
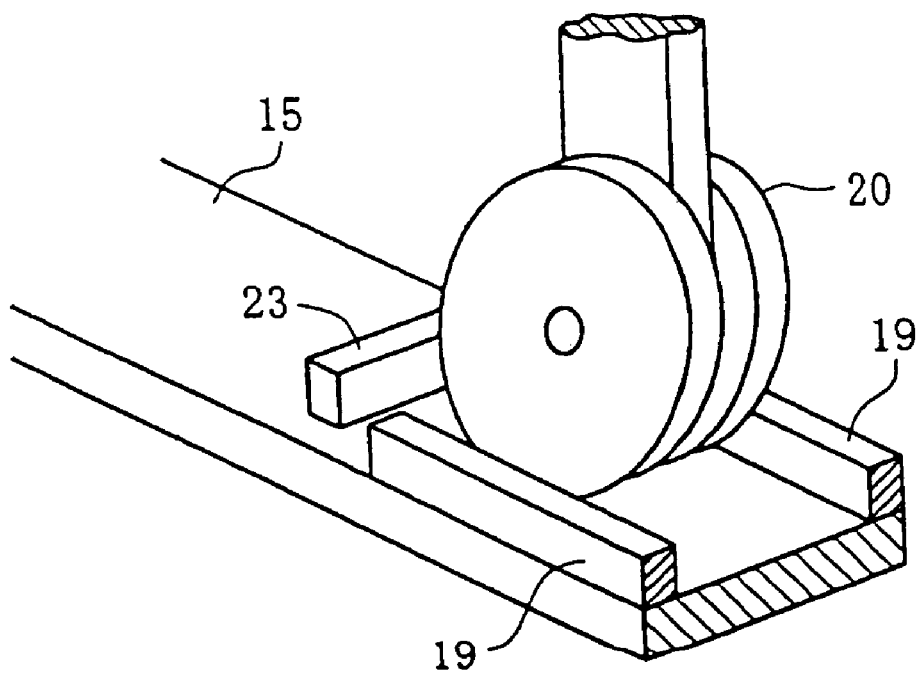
FIG. 8 is a schematic view illustrating a wheel installed on the locator for the side member, and a portion of a lifter on which the wheel is installed.
Figure 11:
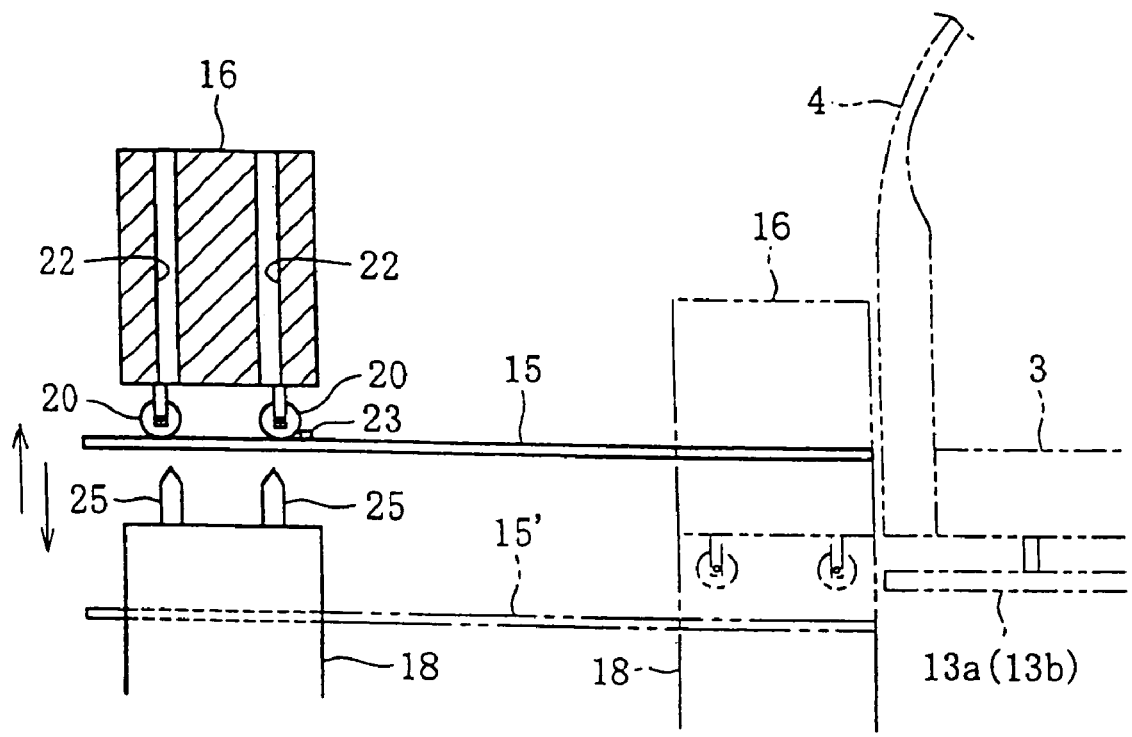
FIG. 11 is a schematic view illustrating methods for placing the locator on the slide base and for locating the side member to the underbody using the locator.
Figure 12:
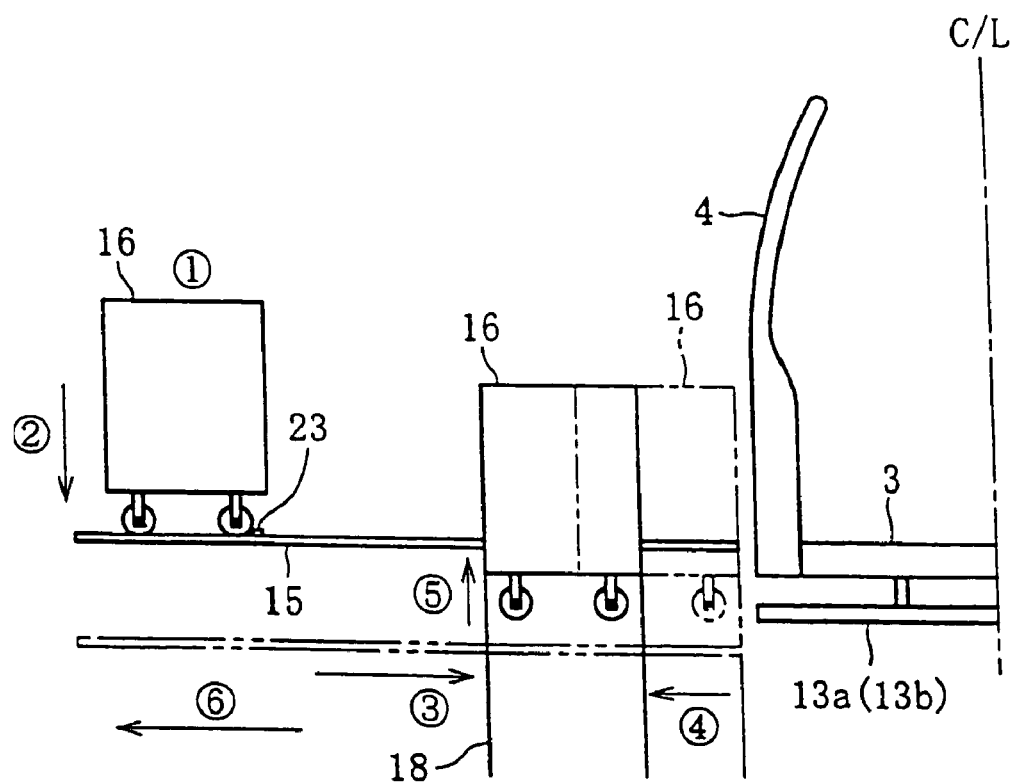
FIG. 12 is a schematic view illustrating a method for replacing the locators.

As can be seen from FIG. 6B, 11 and 12, each locator 16 is equipped with four wheels 20 on its bottom surface. Further, as shown in FIG. 6B, spacers 21 is installed on the bottom surface of the locator 16 for adjusting the height of the locator. On the other hand, spacers 24 that contact with the spacers 21 is installed on the top of the slide base 18. The locator 16 includes a plurality of vertically extending holes 22 at its inside, into which locating pins 25 installed on the slide base 18 are inserted. As shown in FIG. 8, the lifter 15 includes a rear end provided with guards 19 and with a stopper 23 with which the wheel 20 contacts for positioning the locator 16 provisionally.

As shown in FIG. 6B, the position X is the upper limit of the lifter 15 and the top surface of the lifter 15 is flush with the floor level in the position X. On the other hand, the position Y is the lower limit. When lowering to the position Y, the locating pin 25 of the slide base 18 is inserted into the hole 22 of the locator 16, so that the locator 16 is seated on the slide base 18. As can be seen from the figure, the two supporting plates of the lifter 15 are spaced to each other at a certain distance enough to prevent interference with the slide base 18 during the lowering.

Figure 9:
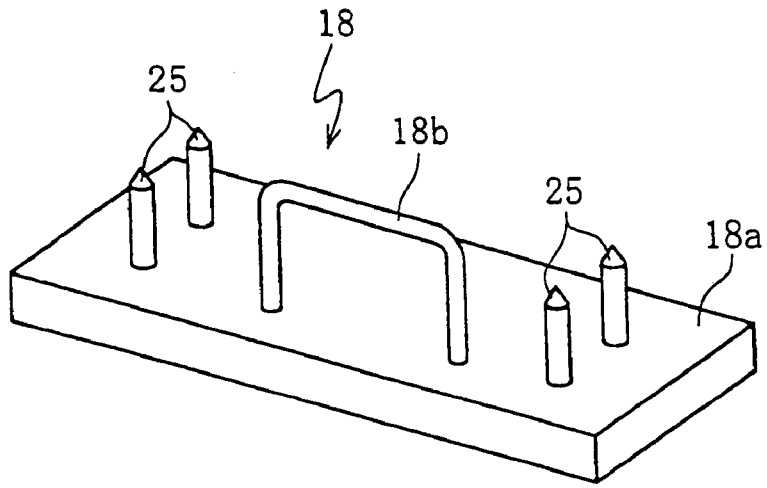
FIG. 9 is a perspective view illustrating an upper portion of a slide base for placing two locators together.
Figure 10A:
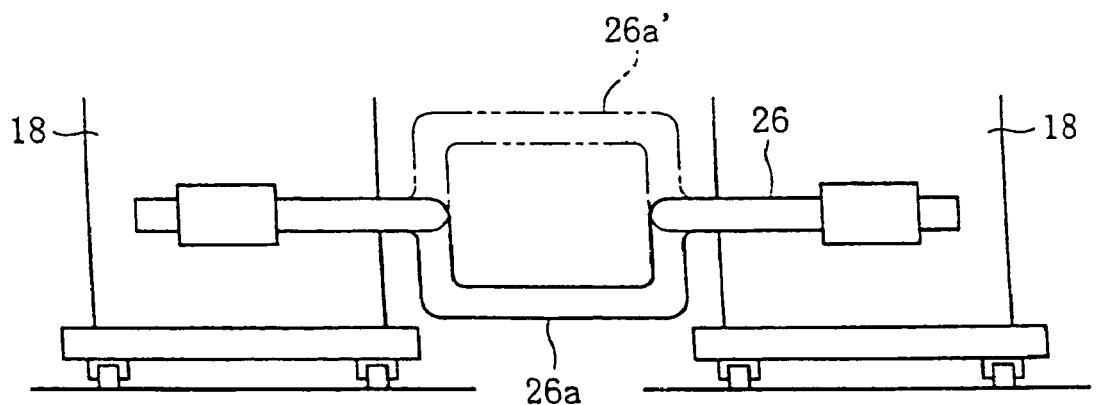
FIG. 10A is a side view illustrating an example of a connecting rod for joining two slide bases.
Figure 10B:
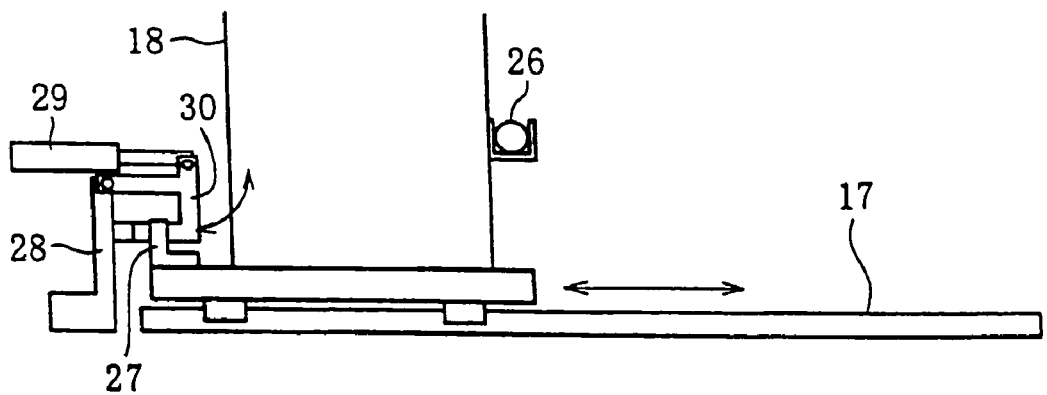
FIG. 10B is a front view illustrating a locating clamp mechanism for the slide base.

According to the present invention, as shown in FIG. 9, two locators 16 may be supported by one slide base 18. In this structure, the slide base 18 includes a base 18a, which is equipped with upright locating pins 25 for locating a plurality of locators 16. The base 18a is further equipped with a handle 18b, which the worker grabs for moving the slide base 18. As shown in FIGS. 10A and 10B, each locator 16 may also be supported by a respective slide base 18. In this way, the worker can get in between two locators 16 to perform spot welding operation. In the illustrated example, two slide bases 18 are joined to each other by means of a removable connecting rod 26. The connecting rod 26 enables the worker to move two slide bases 18 together forwards and backwards. The connecting rod 26 may be linear as a whole, but desirably, is a crank having a bending part 26a between the locators 16, as shown. In the form, when the bending part 26a is positioned downwards (indicated by solid lines in FIG. 10A), the connecting rod 26 does not obstruct the operation at the upper area of the side member 4. When working on the lower area of the side member 4, the bending part 26 is positioned upwards (indicated by chain double-dashed lines in FIG. 10A).

As shown in FIG. 10B, the slide base 18 may be provided with a angle 27 at the front (at the side facing the conveyor 11), and the angle 27 may contact with a stopper 28. Desirably, the stopper 28 includes a jaw 30, which is operated by an air cylinder 29. The jaw 30 clamps the angle 27, thereby the slide base 18 is held firmly at a determined position.

The lifter 15 is moved up and down between the above-described positions X and Y (see FIG. 6B) by, for example, a pantograph mechanism similar to the one shown in FIG. 4B. When the lifter 15 is lifted to the position X, its top surface is flush with the floor level. In this position, the locator 16 with the wheels 20 can be easily moved from the floor onto the rear end of the lifter 15. Thereafter, as shown in FIG. 11, the wheel 20 contacts with the stopper 23 to position the locator 16 provisionally (refer also to the state indicated by reference number 1 in FIG. 12). The slide base 18 is installed below the locator 16. In this state, when the lifter 15 is lowered (as indicated by reference number 2 in FIG. 12), in the middle of lowering the locating pin 25 of the slide base 18 is fitted into the hole 25 of the locator 16, whereby the locator 16 is engaged with and located on the slide base 18. When the lifter 15 is further lowered, the wheel 20 of the locator 16 is detached from the lifter 15, and the locator 16 is finally seated on the slide base 18.

Figure 3:
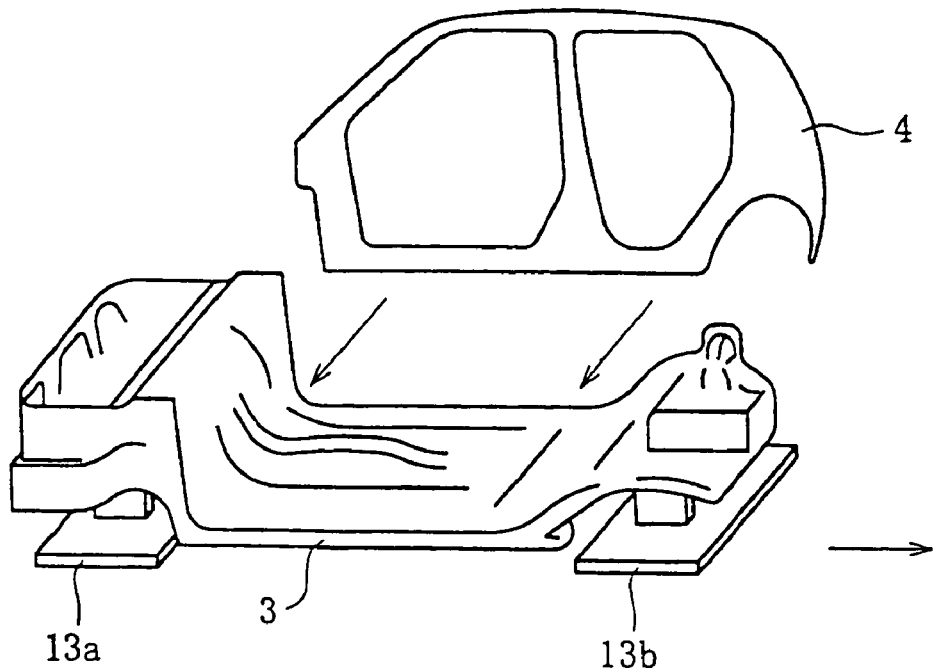
FIG. 3 is a schematic view illustrating the underbody supported by two transfer coasters, and the side member to be fixed to the underbody.

Next, the locator 16 holds the side member 4 and the slide base 18 advances along the slide guide 17 toward the assembly line (as indicated by reference number 3 in FIG. 3). Then, as illustrated by chain double-dashed lines in FIG. 11, the side member 4 is located relative to the underbody 3 that is on standby. In this state, the side member 4 is spot welded to the underbody 3.

After welding, the fixation of the locator 16 to the side member 4 is released and the slide base 18 is retreated at a determined distance (as indicated by reference number 4 in FIG. 12). In this position (hereinafter referred to as "standby position"), the locator 16 holds next side member 4 that is to be spot welded to next underbody 3.

When an underbody 3 of a type different from the previous underbody is transferred to the side member spot welding station 1, the previous locator needs to be replaced with a locator of another type. The procedure of the replacement is described below.

First, the slide base 18 and the previous locator 16 are positioned at the above-described "standby position", and in this state, the lifter 15 is lifted (as indicated by reference number 5 in FIG. 12). During lifting, the wheel 20 of the locator 16 rides on the lifter 15, and when the lifter 15 is further lifted, the locator 16 is detached from the slide base 18. After the lifter 15 is lifted up to be flush with the floor level, the wheel 20 is used to move the locator 16 from the lifter 15 to the floor level. Thereafter, the locator 16 is returned to a locator stock area near the car body assembly line 2.

After the lifter 15 is lifted and the previous locator 16 is detached from the slide base 18, the slide base 18 is retreated to the rear end of the slide guide 17 (as indicated by reference number 6 in FIG. 12). On the other hand, another locator 16 is set on the rear end of the lifter 15 that is at the upper limit (the position X in FIG. 6B) Thereafter, the lifter 15 is lowered in order to transfer the locator 16 to the slide base 18.

The locators used in the above procedure are more compact than conventional one. Therefore, a plurality (one type or various types) of locators can be stored near the car body assembly line 2 without obstructing the operation. Further, the worker can move the locator 16 easily as the wheels 20 are installed on the bottom area of the locator 16. On the contrary, conventional large jig is stored at a place apart from the car body assembly line 2, and transferred to the side member spot welding station 1 from the storage, using a special transfer line, if necessary. According to the present invention, such transfer line for jig is unnecessary.

In the example shown in FIG. 1, two locators 16 are used for each side member 4, however, the present invention is not limited to this. For example, three (or more) locators 16 are used for one side member 4 as shown in FIG. 6A . In this case, each locator may have respective slide guide 17 and slide base 18. Alternatively, a plurality of locators may share one elongated slide base.

Figure 13:
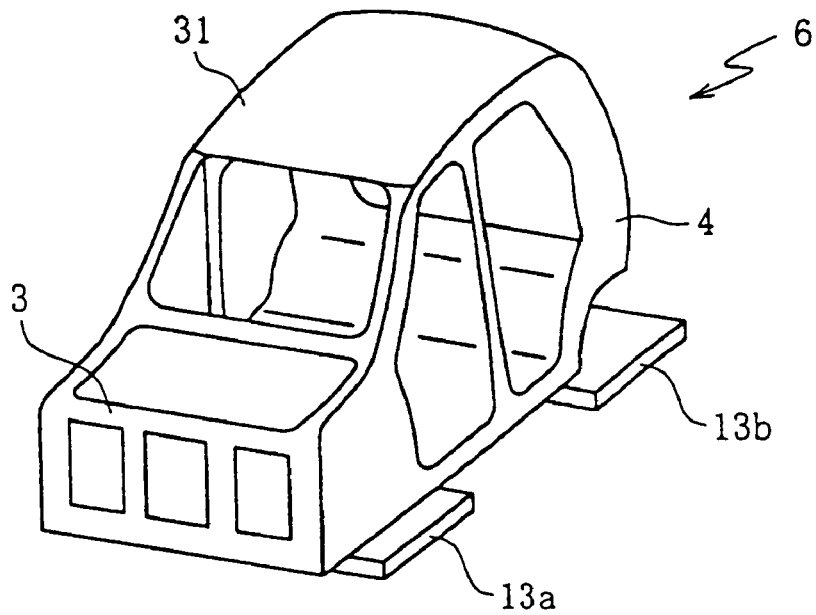
FIG. 13 is a schematic perspective view illustrating the posture of the car body at the roof panel pre-setting station.

The underbody 3 and the side member 4 spot welded to each other are transferred from the spot welding station 1 to the roof panel pre-setting station 6. At the station 6, a roof panel 31 is pre-set and laid over the top of the side members 4 (see FIG. 13). Further at the station 6, the underbody 3 and the side members 4 are re-spot welded. The roof panel 31 is pre-set by the worker manually or using any device such as a hoist.

Figure 14:
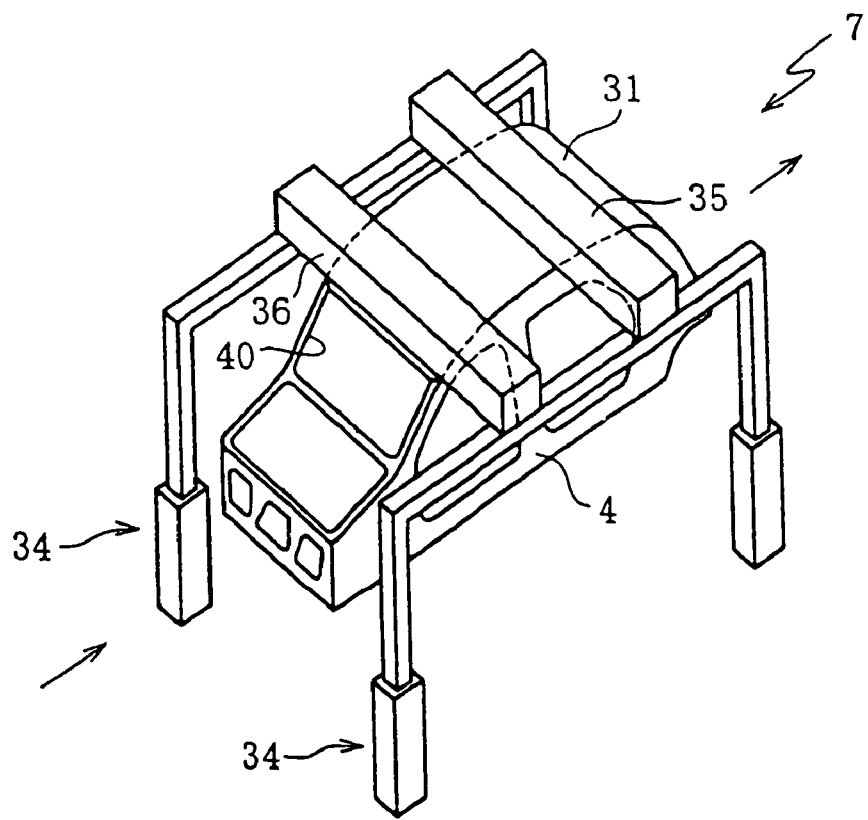
FIG. 14 is a schematic perspective view illustrating the roof panel pre-setting station.

After the pre-setting a roof panel 31, it is spot welded at the roof panel spot welding station 7. As shown in FIG. 14, the roof panel spot welding station 7 is equipped with a pair of frames 34 at the sides of the transfer line. A pair of removable joisted jigs 35, 36 are installed and laid between the upsides of the frames, being spaced to each other in the transfer direction. Further, though not shown in the figure, the station 7 is equipped with a hoist for transferring the jigs 35, 36 and with a spot welding machine for pre-fixing the roof panel 31 to the side member 4. In the illustrated example, though the roof panel 31 is specified as a part to be fixed to the side member 4, the present invention is not limited to this. The present invention can be also applied to fix a part (such as a header inner and a frame back, for example) to be laid across the side members 4, instead of a roof panel 31. Alternatively, reinforcement may be installed across the two frames 34.

Figure 15:
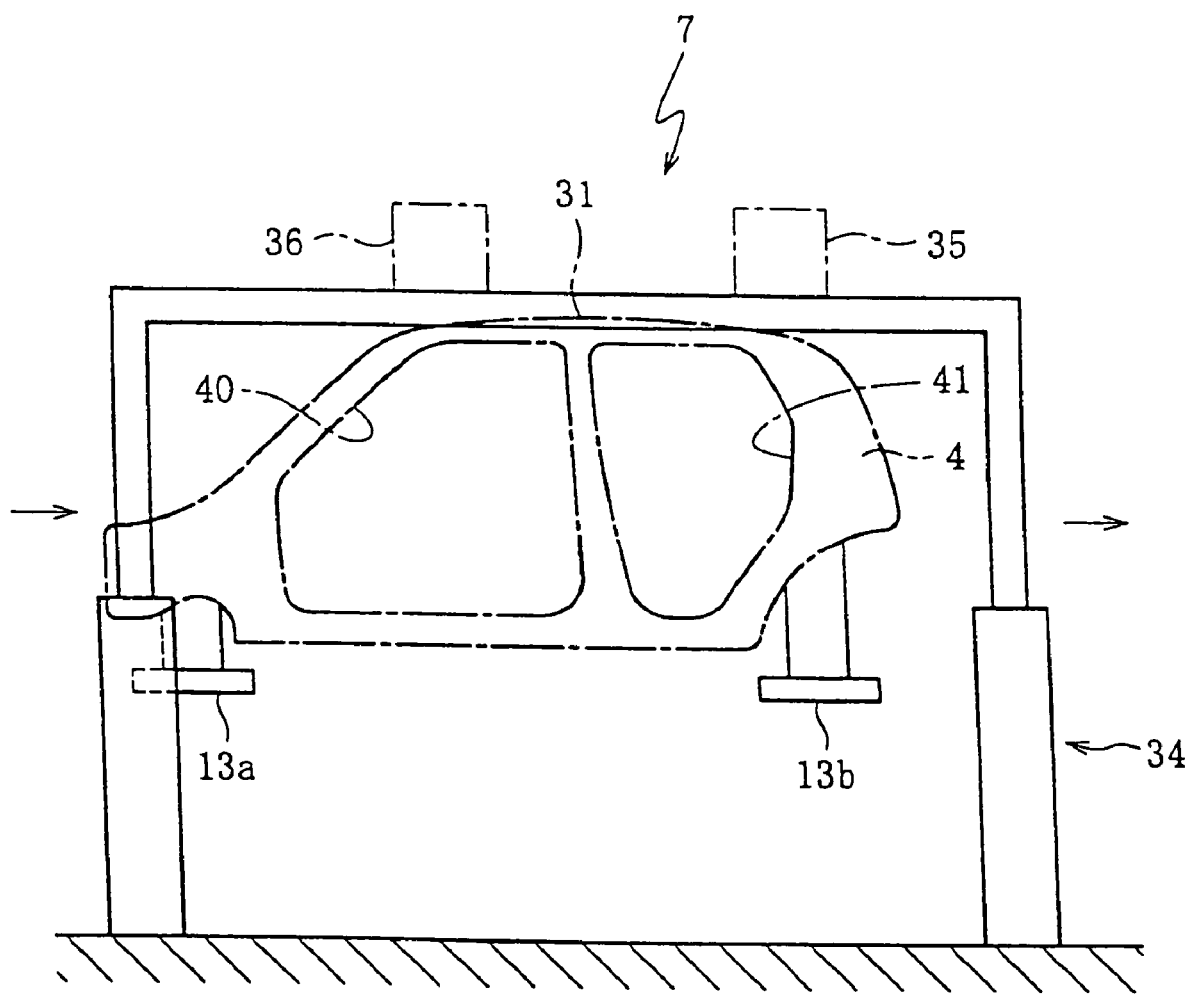
FIG. 15 is a schematic side view of the roof panel pre-setting station.

As shown in FIG. 15, the frame 34 includes vertical bars spaced to each other in the transfer direction and a horizontal bar connecting the vertical bars. The horizontal bar includes a top surface equipped with a clamp mechanism for installing the removable joisted jigs 35, 36.

Figure 16:
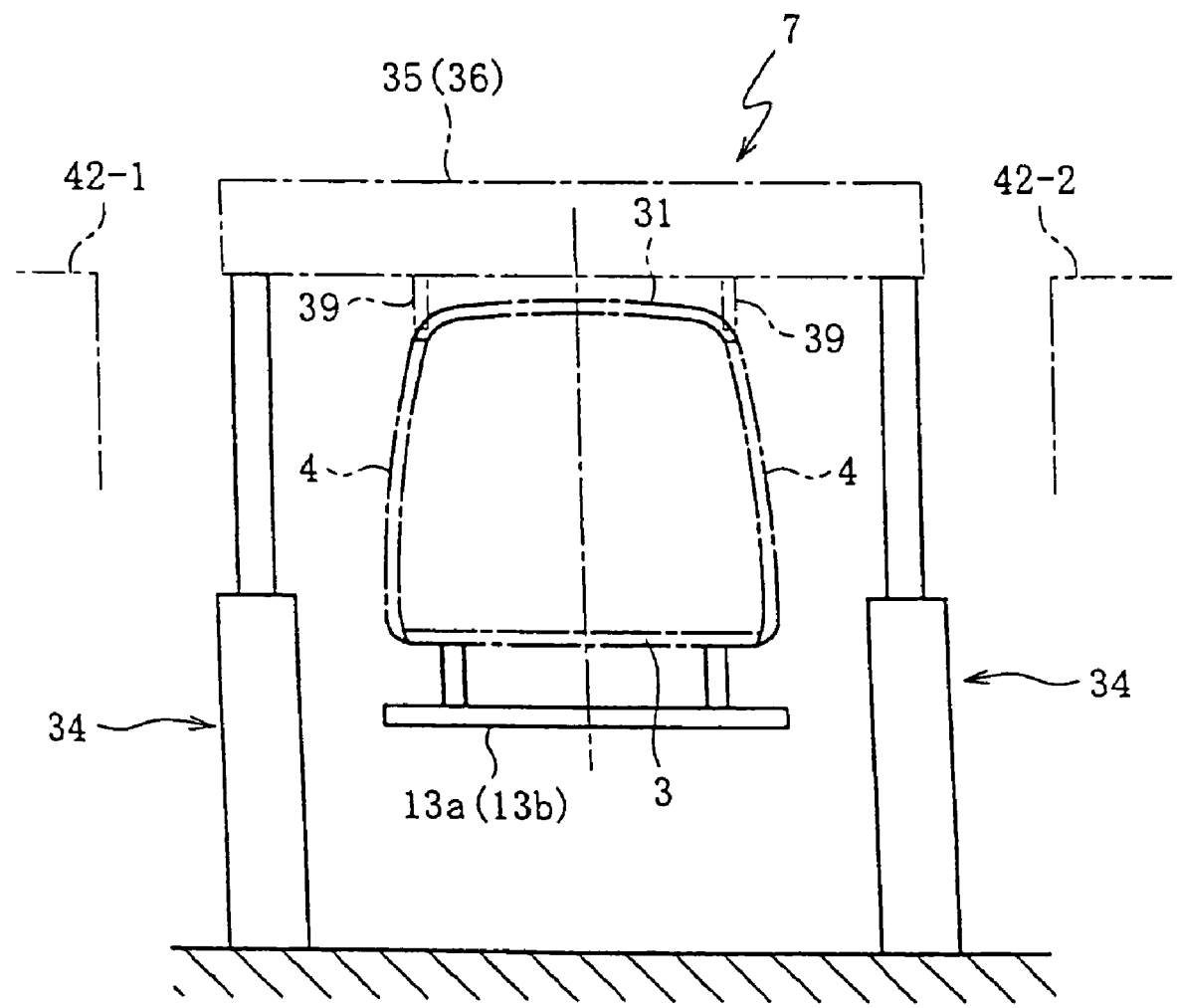
FIG. 16 is a schematic front view of the roof panel pre-setting station.

As shown in FIG. 16, the joisted jigs 35, 36 include a bottom side equipped with a pair of clamp arms 39. The clamp arm 39 is operated manually or by an air cylinder, for connecting an upper welding end of the side member 4 to a welding end of the roof panel 31.

As shown in FIG. 14 or 15, the roof panel 31 is located on the side members 4, whereby a front window opening 40 and a rear window opening 41 are formed. According to the present invention, these openings are not distorted and can be formed as desired. It is because the roof panel 31 and the side members 4 are properly located to each other as the roof panel 31 and the side members 4 are located relatively to a common immovable ground. Specifically, the side member 4 is already re-spot welded to the underbody 3 at the previous station 6. Further, the coasters 13a, 13b supporting the underbody 3 are placed at an immovable system including the ground. Thus, the side member 4 is, though indirectly, fixed to the immovable system. On the other hand, the roof panel 31 can be also fixed to the same immovable system by means of the frame 34 (and the joisted. jigs 35, 36). As a result, the roof panel 31 and the side members 4 can be firmly located to each other, whereby the front window opening 40 and the rear window opening 41 can be formed as desired.

Figure 17:
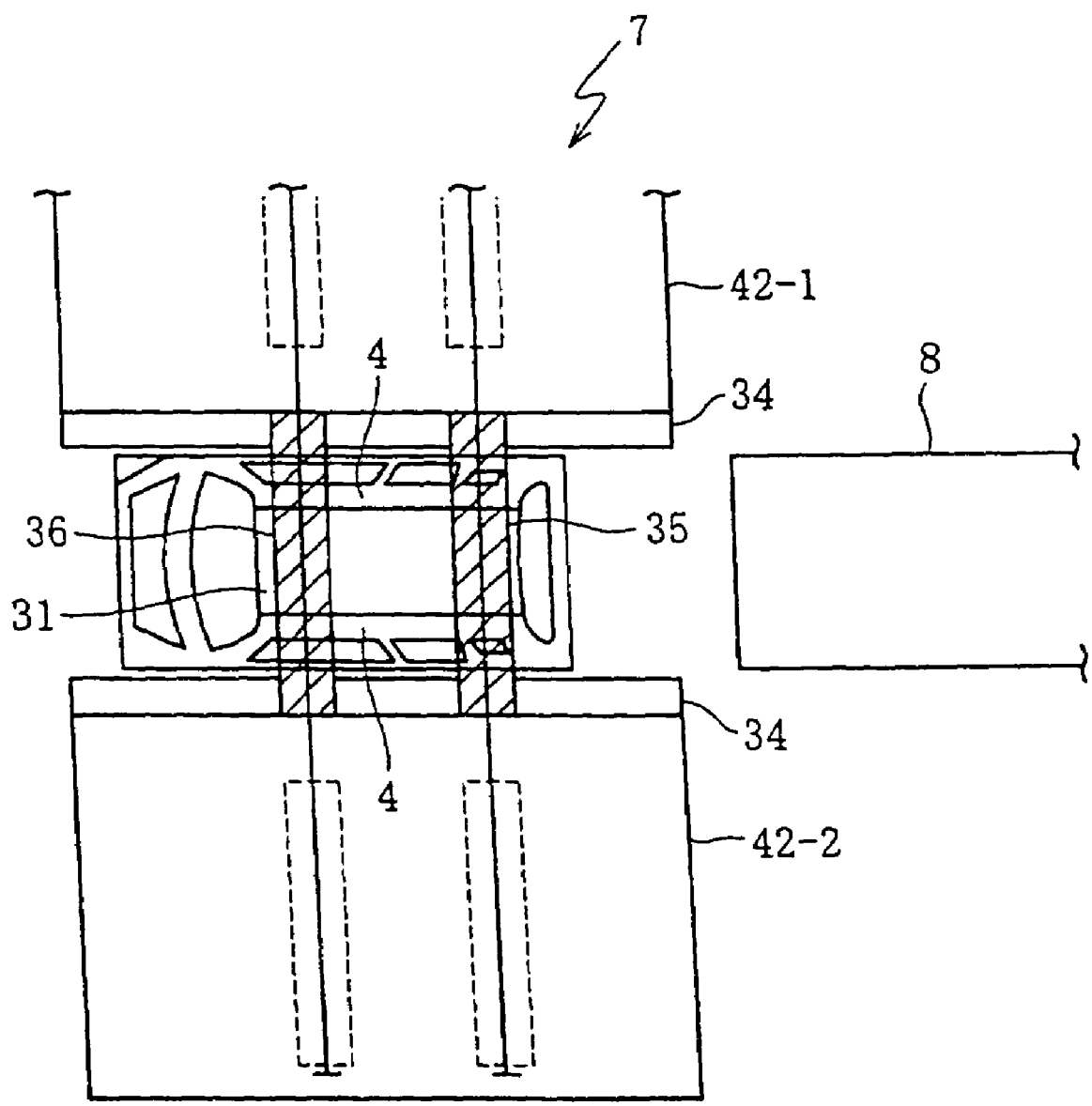
FIG. 17 is a schematic plan view of the roof panel pre-setting station.

As the clamp arms 39 installed at joisted jigs 35, 36 vary with the car type, different clamps arm 39 are necessary for respective car types. In the illustrated example, whole units of joisted jigs 35, 36 including the clamps arms are assigned for respective car types, and a plurality of types of joisted jigs 35, 36 are stored near the car body assembly line. The joisted jigs 35, 36 are attached to the horizontal bar of the frame 34. Thus, as shown in FIGS. 16 and 17, it is desirable to store the joisted jigs 35, 36 at platforms 42-1, 42-2 (having height almost the same as the frame 34) installed adjacent to the car body assembly line.

The joisted jigs 35, 36 may be stored at one of the platforms 42-1, 42-2. In this case, for example, jigs to be attached to the frame 34 are stored at the platform 42-1, and jigs already used and removed from the frame 34 are stored at the platform 42-2. In this way, replacement of the jigs can be effectively performed.

The joisted jigs 35, 36 are installed at the front and rear areas of roof panel 31, with a certain distance between themselves, which provides a wide working space. Therefore, welding operation by a worker is much easier, and a spot welding machine and a re-spot welding machine can be installed in the same area. Further, the easy access to the welding points enables to use a welding machine with relatively short reach.

Conventional jigs for roof panel are larger than a roof panel it self, thereby requiring large facility investment and much time for replacing jigs. Contrary, the jigs according to the present invention are elongated and thus don't take much space, thereby not obstructing the operation even if it is stored near the car body assembly line. Further, as described above, replacement of the jigs is much easier.

FIG. 18A shows a transferring system (indicated by reference number 50) for replacing the joisted jigs 35, 36. As shown, the reference number 51 indicates a ceiling rail 51 from which a hoist 52 is hung. The hoist 52 elevates and lowers a movable rail (see FIG. 18B). A fixed rail 54 is installed below the ceiling rail 51 with a space 55 in between where the movable rail 53 is inserted. The fixed rail 54 is furnished with two stoppers 56 for preventing the movable rail 53 from elevating beyond the fixed rail. The stoppers 56 are installed on the upper surface of the fixed rail 54 and protrude horizontally from the end of the fixed rail. As shown in FIG. 18A, the movable rail 53 and the fixed rail 54 are joined and form, as a whole, one transfer path. In the illustrated example, two pulleys 57 connected each other can move along the transfer path. For connecting two pulleys 57, a rod of a predetermined rigidity or other material can be used (this structure can give a certain space between two pulleys 57). The joisted jig 35 (36) is hung from the pulleys 57. The pulleys 57 can move along the path of the movable rail 53 and the fixed rail 54.

Figure 19A:
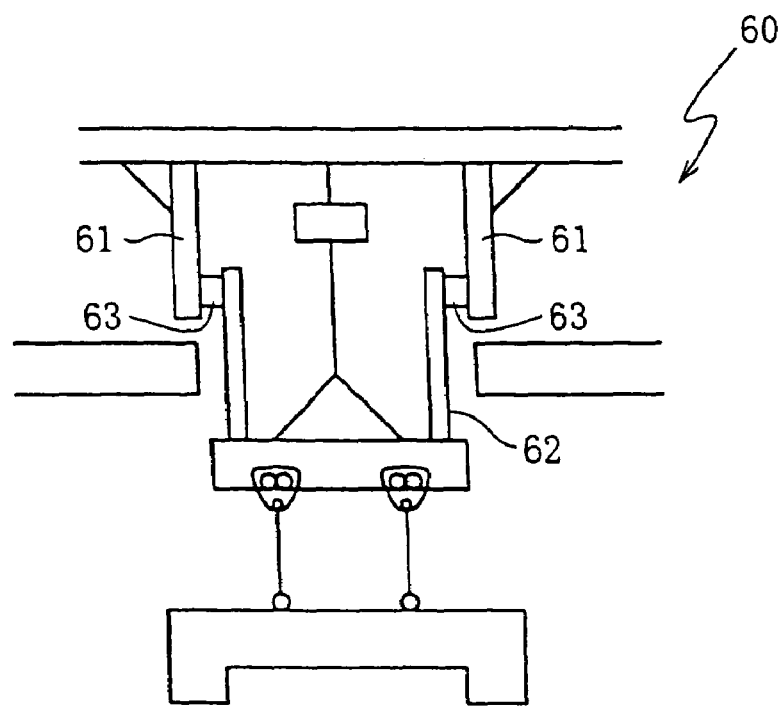
FIG. 19A is a schematic view illustrating a sway prevention mechanism for the movable rail shown in FIG. 18B.
Figure 19B:
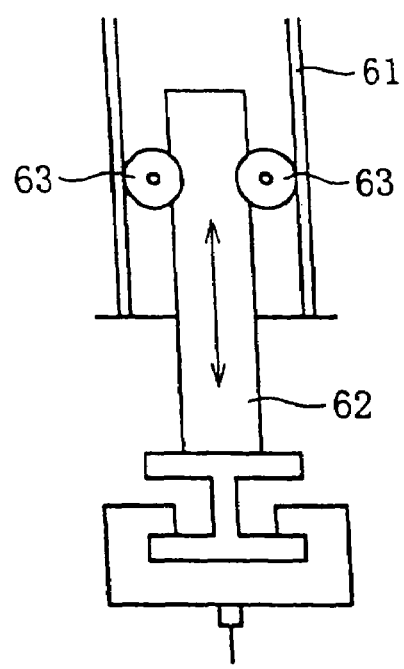
FIG. 19B is a side view illustrating main parts of the sway prevention mechanism.

As shown in FIG. 18A, the pulleys 57 with hung joisted jig 35 (36) is transferred along the fixed rail 54 to the movable rail 53. Thereafter, as shown in FIG. 18B, the movable rail 53 is lowered by the hoist 52, and the joisted jig 35 (36) is positioned on the frames 34. A rail sway prevention mechanism 60 as shown in FIGS. 19A, 19B is furnished for preventing the movable rail 53 from swaying while lowering the joisted jig 35 (36). The illustrated mechanism 60 includes a fixed guide 61 installed on and hung from the ceiling, an upright bar 62 installed on the movable rail 53, and a rotatable roller 63 installed at each upright bar 62. As shown in FIG. 19B, the roller 63 rolls at the inner wall of the fixed guide 61 as the upright bar 62 moves up and down.

Figure 20A:
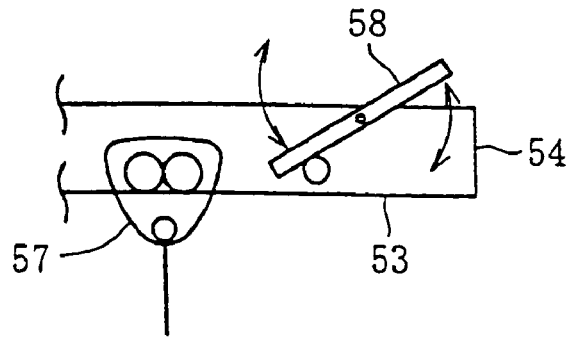
FIG. 20A is a front view illustrating falling-out prevention device for pulley, installed at the movable rail shown in FIG. 18B.
Figure 20B:
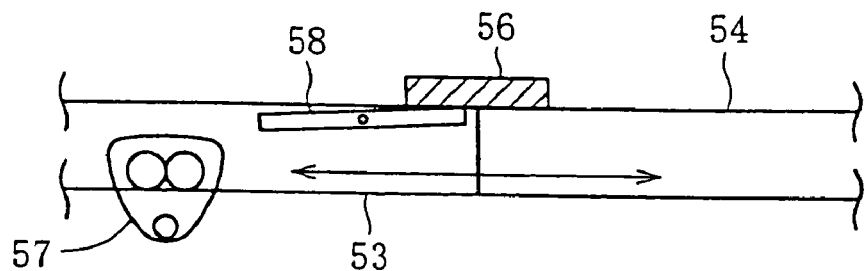
FIG. 20B is a view illustrating a stopper of falling-out prevention device for pulley, in a release position.

When the movable rail 53 is lowered (see FIG. 18B), the pulleys 57 may fall out of the movable rail 53. To prevent the falling, for example, stopper levers 58 are provided as shown in FIGS. 20A, 20B. The stopper lever 58 turns on the pivot, and when the movable rail 53 is lowered, the stopper lever 58 takes a position as shown in FIG. 20A due to biasing force of a spring (not shown). As shown in FIG. 20B, when the movable rail 53 is lifted up and fits in the space 55 of the fixed rail 54, the upper end of the stopper lever 58 is pushed down by the stopper 56. In this way, the stopper 58 lever is brought into a horizontal posture, whereby the pulley 57 can move from the movable rail 53 to the fixed rail 54, and vice versa.

Figure 21:
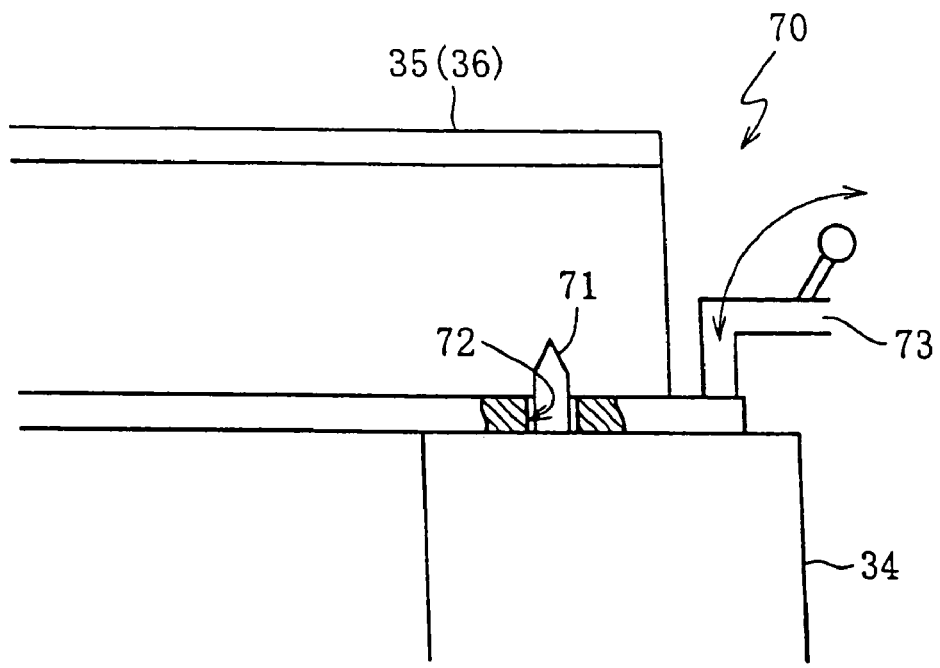
FIG. 21 is a view illustrating a locating clamp mechanism for the joisted-locating jigs.

FIG. 21 illustrates a locating mechanism 70 for attaching the joisted jig 35 (36) to the frame 34. In the illustrated example, a locating pin 71 protrudes from the top surface of the frame 34, while the joisted jig 35 (36) includes a hole 72 in which the locating pin 71 to be inserted. After the locating pin 71 fits in the hole 72, a clamp arm 73 is used to fix the joisted jig 35 (36) to the frame 34.

Figure 22A:
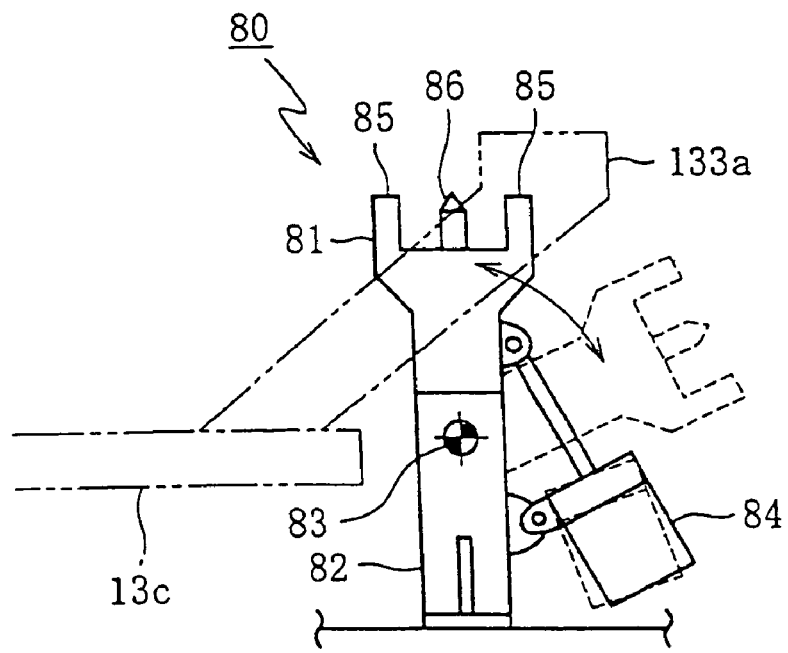
FIG. 22A is a front view illustrating the movement of a locating mechanism provided near the transfer line.
Figure 22B:
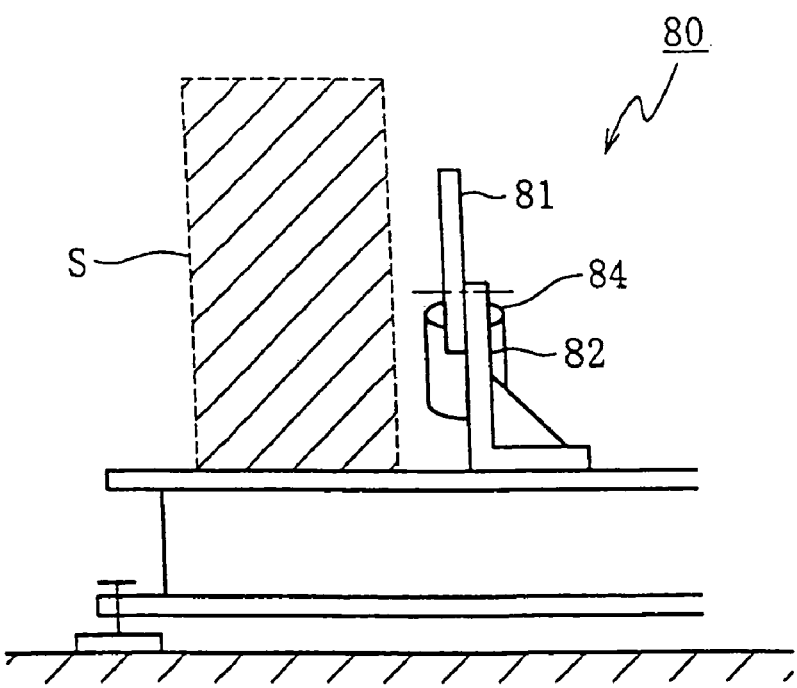
FIG. 22B is a side view illustrating a space to install any additional locating mechanism.

FIGS. 22A and 22B illustrate a locating mechanism 80 which may be installed near the car body assembly line. The mechanism 80 includes an upper part 81 and a lower part 82, and the lower part 82 is fixed to the floor while the upper part 81 is rotatable and joined to the lower part 82 with a pin 83. As shown in FIG. 22A, the lower part 82 is equipped with an air cylinder 84, while the upper part 81 is connected to a drive rod of the air cylinder 84. The upper part 81 can be placed at a vertical position (illustrated by solid lines) or an inclined position (illustrated by broken lines) by moving the drive rod out from and into the main body of air cylinder. The upper part 81 is furnished with two spacers 85 and one locating pin 86.

As described above, the inclining upper part 81 prevents the interference between an object transferred along the assembly line and the locating mechanism 80. In case, for example, of a coaster 13c that includes body-receiving parts 133a protruding in lateral direction as illustrated by chain double-dashed lines in FIG. 22A, the inclined position of the upper part 81 enables proper transfer of the coaster 13c along the assembly line without being obstructed by the locating mechanism 80.

According to the present invention, in addition to the above-described locating mechanism 80, another locating mechanism of different type may be installed. In this case, as shown in FIG. 22B, the additional mechanism can be installed at a space S near the mechanism 80 (or any other place).

The present invention being thus described, it is obvious that the same invention can be modified in various ways. Such modifications should not be regarded as a different idea from this invention or to be out of its scope, and all such modifications as would be obvious to those skilled in the art are intended to be included in the scope of the appended claims.

The invention claimed is:

1. A method of assembling a car body by spot welding a bridging part to a pair of side members fixed to an underbody of a car, the method comprising:

installing a pair of fixed frames at sides of a body transfer line for transferring the underbody and the side members;

attaching a plurality of joisted-locating jigs to the fixed frames for locating the side members and the bridging part, the plurality of joisted-locating jigs being spaced from each other in a transfer direction of the underbody; and spot welding the side members to the bridging part, with the side members and the bridging part clamped by the plurality of joisted-locating jigs;

wherein a first stock area is provided on one side of the body transfer line while a second stock area is provided on an opposite side of the body transfer line, the body transfer line and the pair of fixed frames being interposed between the first and second stock areas; and wherein a transfer system is employed to convey each of the plurality of joisted-locating jigs along a jig transfer line extending above the fixed frames transversely of the body transfer line, from the first stock area to the fixed frames for attachment thereto and from the fixed frames to the second stock area for replacement with other joisted-locating jigs which are also conveyed from the first stock area to the fixed frames.

2. The method of assembling a car body according to claim 1, wherein the fixed frames and each of the plurality of joisted-locating jigs are located and fixed by a clamp mechanism.

3. The method of assembling a car body according to claim 1, wherein the transfer system includes a motor, a movable rail moved up and down by the motor, a fixed rail to be combined with the movable rail, and a pulley movable along the movable rail and the fixed rail, each of the plurality of joisted-locating jigs being hung from the pulley, the fixed rail and the movable rail extending in a direction crossing the transfer direction of the underbody.

4. The method of assembling a car body according to claim 3, wherein a sway prevention mechanism is furnished for preventing the movable rail from swaying when the movable rail and the fixed rail are disconnected.

5. The method of assembling a car body according to claim 4, wherein the sway prevention mechanism includes a pair of vertical rods attached to the movable rail and a pair of fixed guides fixed to an immovable structure, the vertical rods being movable relative to the fixed guides via a roller.

6. The method of assembling a car body according to claim 3, wherein a fall prevention mechanism is provided at the movable rail for preventing the pulley from falling out of the movable rail.

7. The method of assembling a car body according to claim 6, wherein the fall prevention mechanism includes a stopper that turns on the predetermined pivot, the stopper being movable between a position at which the stopper engages with the pulley and a position at which the stopper is disengaged from the pulley.

* * * * *